(12) United States Patent
Krishnamurthy

(10) Patent No.: US 10,380,184 B1
(45) Date of Patent: Aug. 13, 2019

(54) EFFICIENTLY GENERATING CONFIGURATION OPERATIONS FOR NETWORK DEVICES

(71) Applicant: Juniper Networks, Inc., Sunnyvale, CA (US)

(72) Inventor: Pradeep H. Krishnamurthy, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 211 days.

(21) Appl. No.: 15/680,009

(22) Filed: Aug. 17, 2017

(51) Int. Cl.
*G06F 16/901* (2019.01)
*H04L 12/24* (2006.01)

(52) U.S. Cl.
CPC ...... *G06F 16/9014* (2019.01); *H04L 41/0806* (2013.01); *H04L 41/12* (2013.01); *H04L 41/0213* (2013.01)

(58) Field of Classification Search
CPC . G06F 16/9014; H04L 41/0806; H04L 41/12; H04L 41/0213
See application file for complete search history.

(56) References Cited

U.S. PATENT DOCUMENTS 8,060,592 B1* 11/2011 Watsen ................. H04L 41/085
709/223
8,572,091 B1* 10/2013 Sivasubramanian ........................
G06F 16/278
707/747
10,263,850 B2* 4/2019 Gianrossi ................ H04L 41/12
2015/0341218 A1* 11/2015 Chen .................... H04L 41/0833
709/220

OTHER PUBLICATIONS

Harrington et al., "An Architecture for Describing Simple Network Management Protocol (SNMP) Management =Frameworks," RFC 3411, Network Working Group, Dec. 2002, 64 pp.
Enns, "NETCONF Configuration Protocol," RFC 4741, Network Working Group, Dec. 2006, 95 pp.
Bjorklund, "YANG—A Data modeling Language for the Network Configuration Protocol (NETCONF)," RFC 6020, Internet Engineering Task Force, IETF, Oct. 2010, 173 pp.
U.S. Appl. No. 15/198,657, by Juniper Networks, Inc. (Inventors: Jiang et al.), filed Jun. 30, 2016.

* cited by examiner

*Primary Examiner* — Jorge A Casanova
(74) *Attorney, Agent, or Firm* — Shumaker & Sieffert, P.A.

(57) ABSTRACT

An example management device includes memory to store a current set of values and a candidate set of values representing a final state of the current set of values after one or more operations on the current set of values have been performed on the current set of values. The management device also includes a processor to generate operations to be executed by a network device to transform the current set of values into the candidate set of values. The elements may represent collections of objects for which order matters, such as ordering of policies to be enforced by a firewall. The management device generates the operations in an efficient manner, e.g., to reduce the number of steps required to generate the operations, and to reduce the number of operations generated.

22 Claims, 8 Drawing Sheets

EFFICIENTLY GENERATING CONFIGURATION OPERATIONS FOR NETWORK DEVICES

TECHNICAL FIELD

This disclosure relates to computer networks, and more particularly, to configuring devices within computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network services often require configuration of multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network Management (NM) Systems may support these services such that an administrator can easily create and manage these high-level network services. In most of the network service provider deployments, the number of deployed connectivity services are in thousands to millions. When the services are changed, the NM System typically deploys configuration changes throughout the network. In some cases, there may be concurrent changes across the devices within the network, as multiple administrators or management systems may attempt to modify the network services in parallel.

NMS devices in a network typically configure multiple devices in the network to perform coordinated end-to-end services. To keep the devices functional for a service and to avoid disruption of existing services, transactional semantics may be used. Transaction semantics are required when the same device configuration is altered in a concurrent manner. Examples of concurrent configuration cases include: more than one NMS device managing configuration of the same managed device; manual configuration changes by a human operator directly on the device while the device is being managed by a NMS (sometimes referred to as an out-of-band (OOB) configuration change), and a single management system concurrently enabling multiple services on the same device.

In some cases, configuration information of a network device includes elements for which ordering is important. For example, for a firewall device, an ordering of policies to be applied by the firewall device as specified by configuration information may be important. As another example, ordering of routes in a routing device may be important. As yet another example, ordering of authentication processes (e.g., RADIUS, Diameter, and then local authentication) may be important for a gateway device or other device that performs at least part of an authentication procedure.

SUMMARY

In general, this disclosure describes example processes for generating operations (e.g., in NetConf) for updating a current set of configuration data of a network device to a candidate set of configuration data for the network device. The current and candidate sets of configuration data may include sets of elements for which ordering is important, such as firewall policies, routes, authentication processes, or the like. The techniques of this disclosure may be more efficient than conventional reordering processes, and include processes that involve a much lower runtime and/or less computational complexity and processes that generate comparatively fewer reordering operations to be executed by, e.g., managed network devices.

In one example, a method of configuring a network device includes receiving a candidate set of values representing a final state of a current set of values after one or more operations on the current set of values have been performed on the current set of values, generating a hashtable having key values that map index values of elements in the current set of values to index values of matching elements in the candidate set of values, comprising adding the index values of the elements in the current set of values to the hashtable, and for each element in the candidate set of values, adding the element in the candidate set of values to a key value of the hashtable when the hashtable includes the element in the current set of values that matches the element in the candidate set of values, generating a first set of operations of the one or more operations, the first set of operations comprising add or move operations to add or move elements to the current set of values that are present in an order in the candidate set of values but are not present in the order in the current set of values, and generating a second set of operations of the one or more operations, the second set of operations comprising delete operations to delete elements in the current set of values that are not present in the candidate set of values.

In another example, a management device includes one or more memories configured to store a current set of values and a candidate set of values representing a final state of the current set of values after one or more operations on the current set of values have been performed on the current set of values, and one or more processors implemented in circuitry and configured to generate a hashtable having key values that map index values of elements in the current set of values to index values of matching elements in the candidate set of values, wherein to generate the hashtable, the one or more processors are configured to add the index values of the elements in the current set of values to the hashtable, and for each element in the candidate set of values, add the element in the candidate set of values to a key value of the hashtable when the hashtable includes the element in the current set of values that matches the element in the candidate set of values. The processors are further configured to generate a first set of operations of the one or more operations, the first set of operations comprising add or move operations to add or move elements to the current set of values that are present in an order in the candidate set of values but are not present in the order in the current set of values, and generate a second set of operations of the one or more operations, the second set of operations comprising delete operations to delete elements in the current set of values that are not present in the candidate set of values.

In another example, a system includes a network management system (NMS) device, and a network device. The management device includes one or more memories configured to store a current set of values and a candidate set of values representing a final state of the current set of values after one or more operations on the current set of values have been performed on the current set of values, a network interface that communicatively couples the management device to the network device, and one or more processors implemented in circuitry and configured to generate a hashtable having key values that map index values of elements in the current set of values to index values of matching elements in the candidate set of values, wherein to generate the hashtable, the one or more processors are configured to add the index values of the elements in the current set of values to the hashtable, and for each element in the candidate set of values, add the element in the candidate set of values to a key value of the hashtable when the hashtable includes the element in the current set of values that matches the element in the candidate set of values. The processors are further configured to generate a first set of operations of the one or more operations, the first set of operations comprising add or move operations to add or move elements to the current set of values that are present in an order in the candidate set of values but are not present in the order in the current set of values, generate a second set of operations of the one or more operations, the second set of operations comprising delete operations to delete elements in the current set of values that are not present in the candidate set of values, and send the first set of operations and the second set of operations to the network device via the network interface to cause the network device to perform the first set of operations and the second set of operations on a current set of values stored as configuration data of the network device.

In another example, a non-transitory computer-readable medium has stored thereon instructions that, when executed, cause a processor of a network device to generate a hashtable having key values that map index values of elements in the current set of values to index values of matching elements in the candidate set of values, wherein the instructions that cause the processor to generate the hashtable comprise instructions that cause the processor to add the index values of the elements in the current set of values to the hashtable, and for each element in the candidate set of values, add the element in the candidate set of values to a key value of the hashtable when the hashtable includes the element in the current set of values that matches the element in the candidate set of values, generate a first set of operations of the one or more operations, the first set of operations comprising add or move operations to add or move elements to the current set of values that are present in an order in the candidate set of values but are not present in the order in the current set of values, and generate a second set of operations of the one or more operations, the second set of operations comprising delete operations to delete elements in the current set of values that are not present in the candidate set of values.

The details of one or more examples are set forth in the accompanying drawings and the description below. Other features, objects, and advantages of the techniques of this disclosure will be apparent from the description and drawings, and from the claims.

DETAILED DESCRIPTION

Figure 1:
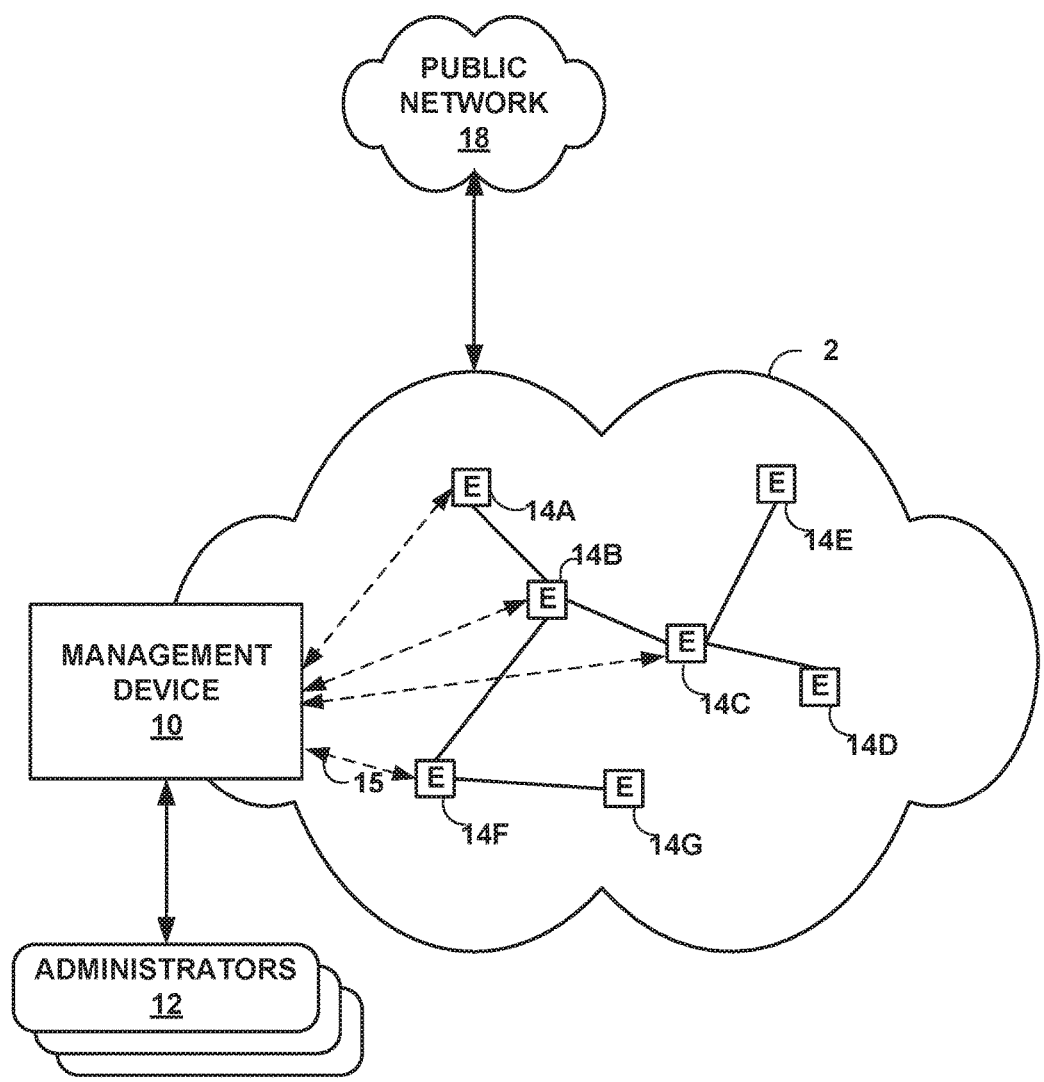
FIG. 1 is a block diagram illustrating an example including elements of an enterprise network that are managed using a management device in accordance with techniques of this disclosure.

FIG. 1 is a block diagram illustrating an example including elements of an enterprise network 2 that are managed using one or more management device 10 in accordance with techniques of this disclosure. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 are communicatively coupled to elements 14 via enterprise network 2. Management device 10, in some examples, form part of a device management system. Management device 10 may be coupled either directly or indirectly to the various elements 14. Once elements 14 are deployed and activated, administrators 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS devices, and elements 14 are centrally maintained by an IT group of the enterprise. Administrators 12 interacts with management device 10 to remotely monitor and configure elements 14. For example, administrators 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to managing an enterprise network, the techniques of this disclosure are applicable to managing other network types, public and private, including service provider networks, managed provider networks, cloud-based storage or compute networks that provides cloud services, or other networks.

In some examples, administrators 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, SSH, hypertext transfer protocol (HTTP), or other network session, to enter text in accordance with a defined syntax to submit commands to the managed element. In some examples, the user initiates a communication session 15 with one of elements 14, e.g., element 14F, using management device 10, to directly configure element 14F. In this manner, a user can provide commands in a format for execution directly to elements 14.

Further, administrators 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrators 12 uses management device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Management device 10 use one or more network management protocols designed for management of configuration data within managed network elements 14, such as the SNMP protocol or the Network Configuration Protocol (NETCONF) or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Management device 10 may establish NETCONF, SNMP, or other network management protocol sessions with one or more of elements 14.

Management device 10 may be configured to compare a new set of configuration data to an existing (or old) set of high-level configuration data to determine differences between the new set of high-level configuration data and the old set of high-level configuration data. Management device 10 then apply corresponding functions, such as operations generation functions, to the differences between the new and old high-level configuration data. In particular, management device 10 determine whether the new set of configuration data includes any additional configuration data elements relative to the old set of high-level configuration data, whether the new set of configuration data modifies any configuration data elements relative to the old set of high-level configuration data, and/or whether the new set of configuration data omits any configuration data elements that were included in the old set of high-level configuration data. In some examples, management device 10 include a first set of translation functions for translating additional or modified configuration data elements, and a second set of translation functions for translating deleted configuration data elements. Thus, management device 10 execute the appropriate translation function for the additional, modified, or deleted configuration data elements.

Either or both of high-level configuration data and low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. Management device 10 include one or more translation functions for translating high-level configuration data to low-level (i.e., device-level) configuration data. These functions are configured to accept the high-level configuration data (which may be expressed as structured input parameters, e.g., according to YANG). In some examples, the functions are also configured to output respective sets of low-level device configuration data changes, e.g., device configuration additions, updates, and deletions. Additional details regarding an example process for translating high-level configuration information to low-level device configuration information are described in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. After translating high-level configuration changes to low-level configuration changes, management device 10 send the low-level configuration changes to elements 14.

In some cases, changes to configuration data of elements 14 may involve modifying an order of collections of values (e.g., policies, routes, authentication servers, or the like) within the configuration data. Ensuring that these values appear in the specified order in configuration data of elements 14 may be important, such as for policies that are checked and applied in the specified order. One of administrators 12 may modify ordering of values by performing one or more of moving values up or down, adding new values to the collection, deleting some values, and/or updating existing values. In accordance with the techniques of this disclosure, management device 10 may generate a set of configuration update operations (e.g., NETCONF operations) to be included in configuration changes sent to elements 14 that specify reordering of existing values in the configuration data. Such operations may include "insert=first" or "insert=after," along with "create" and "delete" operations, to ensure that the collection values (e.g., firewall policies) on elements 14 are ordered according to the updated configuration information as represented in management device 10.

An existing algorithm for generating an optimal number of moves for reordering values in a list has a complexity of $O(n^2)$, where n represents the size of the list. Thus, the existing algorithm can be inefficient in certain cases. It is possible to have an algorithm of O(n) complexity for reordering values in a list, but this algorithm may not generate the optimal number of moves in some cases, such that this algorithm is inefficient in certain cases. The techniques of this disclosure provide optimized, efficient algorithms for reordering existing values in a collection of configuration data, as well as techniques for selecting which of the algorithms to perform.

In describing the algorithms and techniques of this disclosure, let "CURRENT" represent the current configuration of elements 14, "CANDIDATE" represent new configuration according to which elements 14 are to be configured, "LCS" represent the longest common subsequence of values between the current configuration and the new configuration, "OFFSET" represent the difference in position of a matching value in CURRENT and CANDIDATE, and "SKEWNESS" represent a percent of sub-optimal moves generated, compared to the most optimal number of moves (where this percent is calculated based on the number of elements in CURRENT).

A first algorithm, referred to hereafter as "Algorithm A," generally involves considering values in a collection of CURRENT as being part of a doubly-linked list. Then, performance of Algorithm A involves iterating over the values of the doubly-linked list in the order they appear in CANDIDATE and generating an "insert=first" or "insert=after" operation only if the element in CURRENT is not after the required key element in the doubly-linked list. Then, performance of Algorithm A involves updating the doubly-linked list based on the "insert" operation to update the order of the elements. This will eventually ensure that the elements in CURRENT are rearranged to match the order in CANDIDATE through execution of the "insert" operations by elements 14. Management device 10 may perform Algorithm A as part of generating configuration update information to send to elements 14.

An example of Algorithm A is more formally described as follows:

1) Create a Hashtable having key values of (current_index, candidate_index)
    a. i.e., for a given key, determine the index of the matching element in CURRENT/CANDIDATE, where the index of an element is a value representing a position of the element in the ordered set of CURRENT elements or CANDIDATE elements.
2) Iterate over the elements (incrementing current_index) in CURRENT and populate the Hashtable with current_index
3) Iterate over the elements in CANDIDATE and
    a. Create a map candidate_to_current_index_map, and
    b. Populate the Hashtable with candidate_index
    c. If the current_index is present, set candidate_to_current_index_map[candidate_index]=current_index
4) Link the elements in CURRENT as a doubly-linked list
5) Iterate over the elements in CANDIDATE and emit an (insert=first) or (insert=after, key) only if necessary
    a. Use the candidate_to_current_index_map to find the corresponding element in CURRENT
    b. If corresponding element is not present, generate an insert tag along with operation=create and update the doubly-linked list;
    c. Else if corresponding element is already present after the required element in the doubly-linked list, no insert tag is needed;
    d. Else generate an "insert=after" tag and update the doubly-linked list
6) Iterate over the elements in Hashtable
    a. For elements for which the candidate_index is missing, generate a delete tag Algorithm A is of complexity O(n), where n represents the number of elements in CANDIDATE. In some cases, performance of Algorithm A results in unnecessary "insert" operations. For example, when the first element of CURRENT is moved to the bottom in CANDIDATE, performance of Algorithm A yields generation of an "insert" operation for each element. Thus, as an alternative (e.g., depending on the data of CURRENT and CANDIDATE), management device 10 may instead perform Algorithm B.

In general, Algorithm B involves computing the longest common subsequence (LCS) between CURRENT and CANDIDATE. Algorithm B modifies Algorithm A in that, while iterating over the elements in the order they appear in CANDIDATE (i.e., step 5 of Algorithm A), Algorithm B involves skipping elements that are part of the LCS. Thus, Algorithm B generally augments step 5 of Algorithm A as further including:

5) Compute LCS between CURRENT and CANDIDATE and mark the elements included in the LCS in CANDIDATE as being part of the LCS. Iterate over the elements in CANDIDATE and skip the element if it is part of LCS.

Algorithm B generates optimal moves, but computing the LCS is of complexity $O(n^2)$, where n represents the number of elements in CANDIDATE. Thus, if one of administrators 12 simply moved up one rule in CURRENT to produce CANDIDATE, using Algorithm A would be less efficient than Algorithm B.

Accordingly, management device 10 may determine whether to use Algorithm A or Algorithm B according to Algorithm C. In general, when an element is moved down from its current position in CURRENT, the maximum sub-optimal moves that can be generated is the difference between the current position (i.e., the position of the element in CURRENT) and the candidate position (i.e., the position of the element in CANDIDATE). Based on this, Algorithm C involves determining a maximum sub-optimal moves that can be generated and, based on a heuristic, determine if the maximum sub-optimal moves is acceptable. Based on this, Algorithm C involves determining whether to use Algorithm A or Algorithm B.

An example of Algorithm C may be defined more formally as a modification to Algorithm A, as follows:
1) Replace Step 1 of Algorithm A above with: Create a Hashtable having key values of (current_index, candidate_index, offset), and set a variable max_offset=0
2) Add to Step 3(c) of Algorithm A above: If the current_index is present, populate offset=candidate_index−current_index; update max_offset if (candidate_index −current_index) >the existing value of max_offset
3) Replace Step 5 of Algorithm A above with: Acceptable-skewness=S (where S is any value ranging from 0 to 1, e.g., 0.2, e.g., as set by one of administrators 12)
   a. Acceptable-number-of-sub-optimal-moves=(number of elements in CURRENT) ×(Acceptable-skewness),
   b. If max_offset <Acceptable-number-of-sub-optimal-moves, use Algorithm A (i.e., Step 5 of Algorithm A);
   c. Else use Algorithm B (i.e., augment Step 5 of Algorithm A with Step 5 of Algorithm B, as discussed above).

As an example, management device 10 may include the following set of values, expressed in XML in this example, as a current set of values:

```
<configuration>
    <security>
        <policies>
            <policy>
                <from-zone-name>blr</from-zone-name>
                <to-zone-name>svl</to-zone-name>
                <policy>
                    <name>rule3</name>
                    <description>Rule 3</description>
                </policy>
                <policy>
                    <name>rule0</name>
                    <description>Rule 0</description>
                </policy>
                <policy>
                    <name>rule1</name>
                    <description>Rule 1</description>
                </policy>
                <policy>
                    <name>rule5</name>
                    <description>Rule 5</description>
                </policy>
            </policy>
        </policies>
    </security>
</configuration>
```

Management device 10 may further receive the following set of values, again expressed in XML in this example, as a candidate set of values:

```
<configuration>
    <security>
        <policies>
            <policy>
                <from-zone-name>blr</from-zone-name>
                <to-zone-name>svl</to-zone-name>
                <policy>
                    <name>rule0</name>
                    <description>Rule 0</description>
                </policy>
                <policy>
                    <name>rule1</name>
                    <description>Rule 1</description>
                </policy>
                <policy>
                    <name>rule2</name>
                    <description>Rule 2</description>
                </policy>
                <policy>
                    <name>rule3</name>
                    <description>Rule 3</description>
                </policy>
                <policy>
                    <name>rule4</name>
                    <description>Rule 4</description>
                </policy>
            </policy>
        </policies>
    </security>
</configuration>
```

Management device 10 may apply the techniques of this disclosure to generate operations, e.g., NETCONF commands, to transform a current set of values into a candidate set of values. For example, according to the techniques of this disclosure, management device 10 may generate the example XML data shown below, including NETCONF commands to transform the example current set of values into the example candidate set of values shown above:

```
<configuration>
    <security>
        <policies>
            <policy>
                <from-zone-name>blr</from-zone-name>
                <to-zone-name>svl</to-zone-name>
                <policy insert="after" name="rule 1" operation="create">
                    <name>rule2</name>
                    <description>Rule 2</description>
                </policy>
                <policy insert="after" name="rule2">
                    <name>rule3</name>
                </policy>
                <policy insert="after" name="rule3" operation="create">
                    <name>rule4</name>
                    <description>Rule 4</description>
                </policy>
                <policy operation="delete">
                    <name>rule5</name>
                </policy>
            </policy>
        </policies>
    </security>
</configuration>
```

Figure 2:
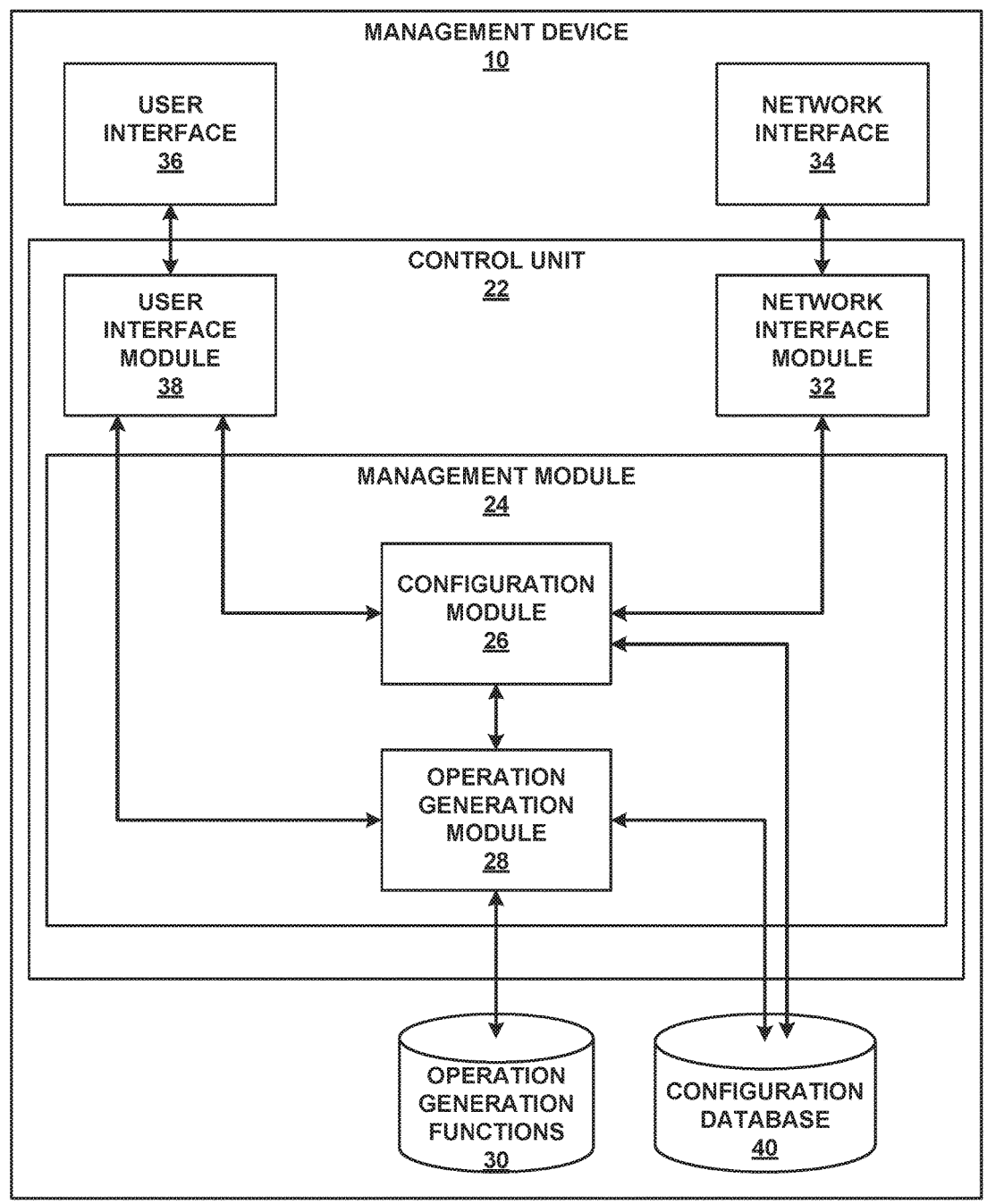
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrators 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit operations to configure the network devices. In this example, management module 24 further includes configuration module 26 and operation generation module 28.

In some examples, management module 24 is configured to receive configuration instructions for a set of managed network devices (e.g., elements 14 of FIG. 1) from a user, such as administrators 12. Over time, the user may update the configuration instructions, e.g., to add new services, remove existing services, or modify existing services performed by the managed devices, which may include modification to a set of values for which order is important. The instructions may be structured according to, e.g., Yang.

Management device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information for the managed devices (e.g., elements 14).

As noted above, in some cases, updated configuration for managed devices includes reordering of a set of elements for which ordering is important. Operation generation module 28 generally determines differences between a current set of values (included in current configuration for managed devices) and a candidate set of values (included in candidate configuration for the managed network devise), and generates operations for transforming the current set of values into the candidate set of values, according to the techniques of this disclosure. For example, operation generation module 28 may execute one of Algorithms A, B, or C, as discussed above. Instructions for these algorithms are stored in operation generation functions 30 of FIG. 2. Additional details of these techniques are discussed below with respect to FIGS. 3-6 below.

Figure 3:
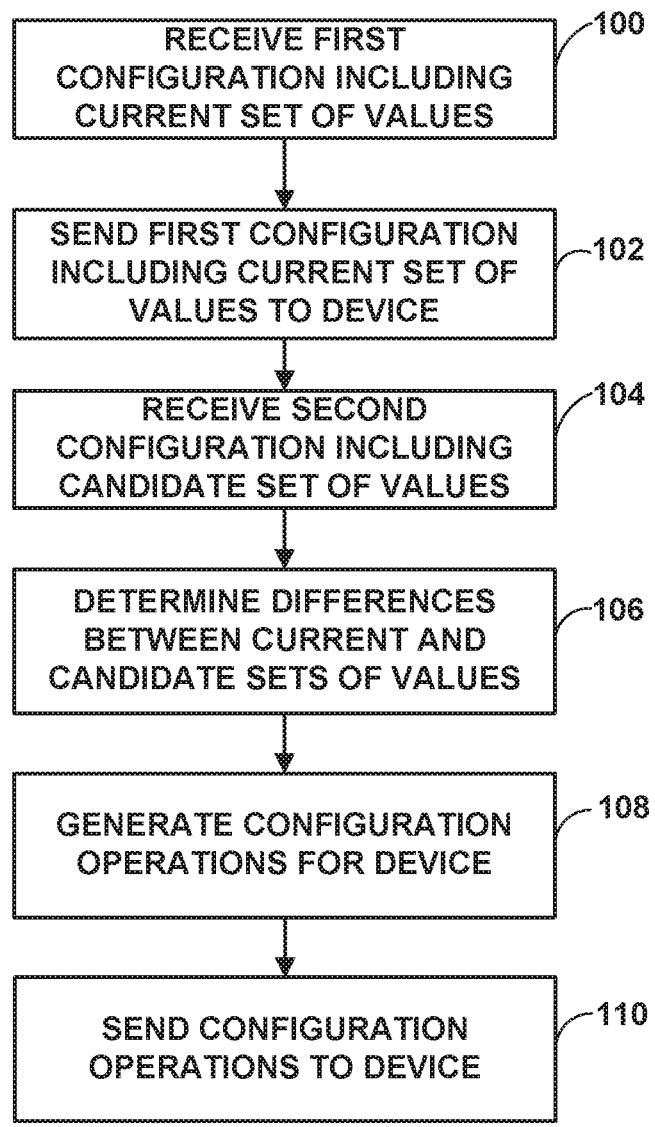
FIG. 3 is a flowchart illustrating an example method of configuring and reconfiguring a managed device in accordance with techniques of this disclosure.

FIG. 3 is a flowchart illustrating an example method of configuring and reconfiguring a managed device in accordance with techniques of this disclosure. The method of FIG. 3 is explained with respect to management device 10 (representing an example of a network management system (NMS) device) of FIGS. 1 and 2. However, it should be understood that other devices may be configured to perform this or a similar method.

In this example, initially, management device 10 receives a first configuration including a current set of values (100) for which ordering is important. Management device 10 may receive the first configuration from administrator 12. In particular, administrator 12 may enter or submit data representing the first configuration for a group of managed network devices, e.g., one or more of elements 14. Administrator 12 may provide the first configuration via user interface 36. User interface module 38 receives data representing the first configuration via user interface 36 and provides the data to configuration module 26 of management module 24.

Configuration module 26 then sends the first configuration, including the current set of values, to one or more of elements 14 (102). Moreover, configuration module 26 may store the first configuration to configuration database 40, along with data indicating which of elements 14 are configured according to the first configuration.

Subsequently, management device 10 receives a second configuration including a candidate set of values (104) for which ordering is also important. Configuration module 26 provides the second configuration to operation generation module 28. In this case, operation generation module 28 determines differences between the current set of values of the first configuration and the candidate set of values of the second configuration (106). In particular, according to the techniques of this disclosure, operation generation module 28 generates configuration operations for transforming the current set of values into the candidate set of values, such that after transformation, the current set of values corresponds to the candidate set of values (including the elements of the candidate set of values in the order of the candidate set of values).

To generate these configuration operations, operation generation module 28 may execute any of Algorithms A, B, or C, as discussed above. In particular, operation generation module 28 may determine which of operation generation functions 30 (e.g., which of Algorithms A, B, or C) to apply to the data describing the differences and then executes the determined operation generation function to generate operations for transforming the current set of values to the candidate set of values according to the selected operation generation function (108). Configuration module 26 then sends the generated operations to the device (110). In accordance with the techniques of this disclosure, these operations are defined such that, when executed by the device, they cause the device to transform the current set of values into the candidate set of values. For example, configuration module 26 may submit commands to the devices to add, move, or remove values to the current set of values. The configuration operations for modifying the current set of values may include "insert=first," "insert=after," "delete," or other such commands for adding, moving, or deleting elements of the set of values.

Figure 4:
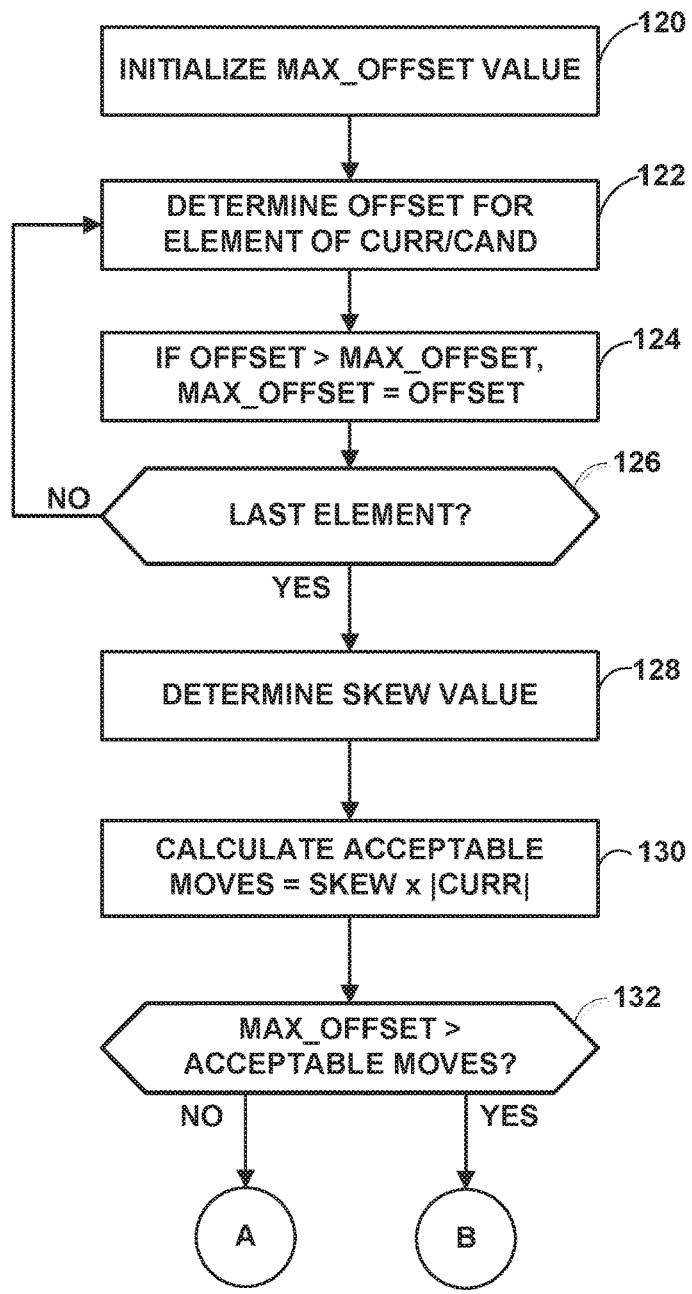
FIG. 4 is a flowchart illustrating an example method for selecting a process by which to generate configuration operations according to the techniques of this disclosure.

FIG. 4 is a flowchart illustrating an example method for selecting a process by which to generate configuration operations according to the techniques of this disclosure. For purposes of explanation, the method of FIG. 4 is explained as being performed by management device 10, although it should be understood that other devices may be configured to perform the techniques of FIG. 4 as well. Management device 10 may perform the method of FIG. 4 as part of, e.g., steps 106 and 108 of the method of FIG. 3. The method of FIG. 4 generally corresponds to portions of Algorithm C as discussed above. It is assumed, as discussed above with respect to FIG. 3, that management device 10 includes a current set of configuration data that was previously sent to one or more of elements 14 and includes a current set of values (CURR) for which ordering is important, and that management device 10 has received a candidate set of configuration data that is to be applied to one or more of elements 14 and that includes a candidate set of values (CAND) for which ordering is important and corresponding to CURR.

In this example, management device 10 initializes a max_offset value (120) (e.g., a variable). That is, management device 10 may declare the variable and set the value of the max_offset value equal to zero. Management device 10 then determines an offset for an element of both CURR and CAND (122). The offset represents a difference between an index in CAND for the element and an index in CURR for the element. If CAND includes an element that is not included in CURR (or vice versa), management device 10 skips this element.

Management device 10 then determines whether the offset is greater than the current max_offset value, and if so, management device 10 resets the max_offset value to equal the offset value (124). Management device 10 then determines whether the most recently analyzed element is the last element of CAND/CURR (126). If not ("NO" branch of 126), management device 10 proceeds to a next element in both CAND and CURR and determines whether to update the max_offset value accordingly (per steps 122 and 124).

After analyzing each of the corresponding elements of CAND and CURR (i.e., after analyzing the last corresponding element of CAND and CURR ("YES" branch of 126)), management device 10 determines a skew value (128). The skew value may be any rational value between 0 and 1, e.g., 0.2. This value may be set by an administrator, and/or may be determined heuristically. The skew value generally represents an acceptable skewness. Management device 10 then calculates an acceptable moves value as being equal to the skew value multiplied by the size of the current set of values (130). That is, acceptable moves=skew*|CURR|.

Management device 10 then determines a technique by which to generate operations (e.g., NetConf-based instructions) for transforming CURR into CAND, e.g., between Algorithm A and Algorithm B as described above. In particular, in this example, management device 10 determines whether the max_offset value is greater than the acceptable moves value (132). If the max_offset value is less than or equal to the acceptable moves value ("NO" branch of 132), management device 10 selects Algorithm A, whereas if the max_offset value is greater than the acceptable moves value ("YES" branch of 132), management device 10 selects Algorithm B. Another example of Algorithm A is explained with respect to FIG. 5 below, and another example of Algorithm B is explained with respect to FIG. 6 below.

Figure 5:
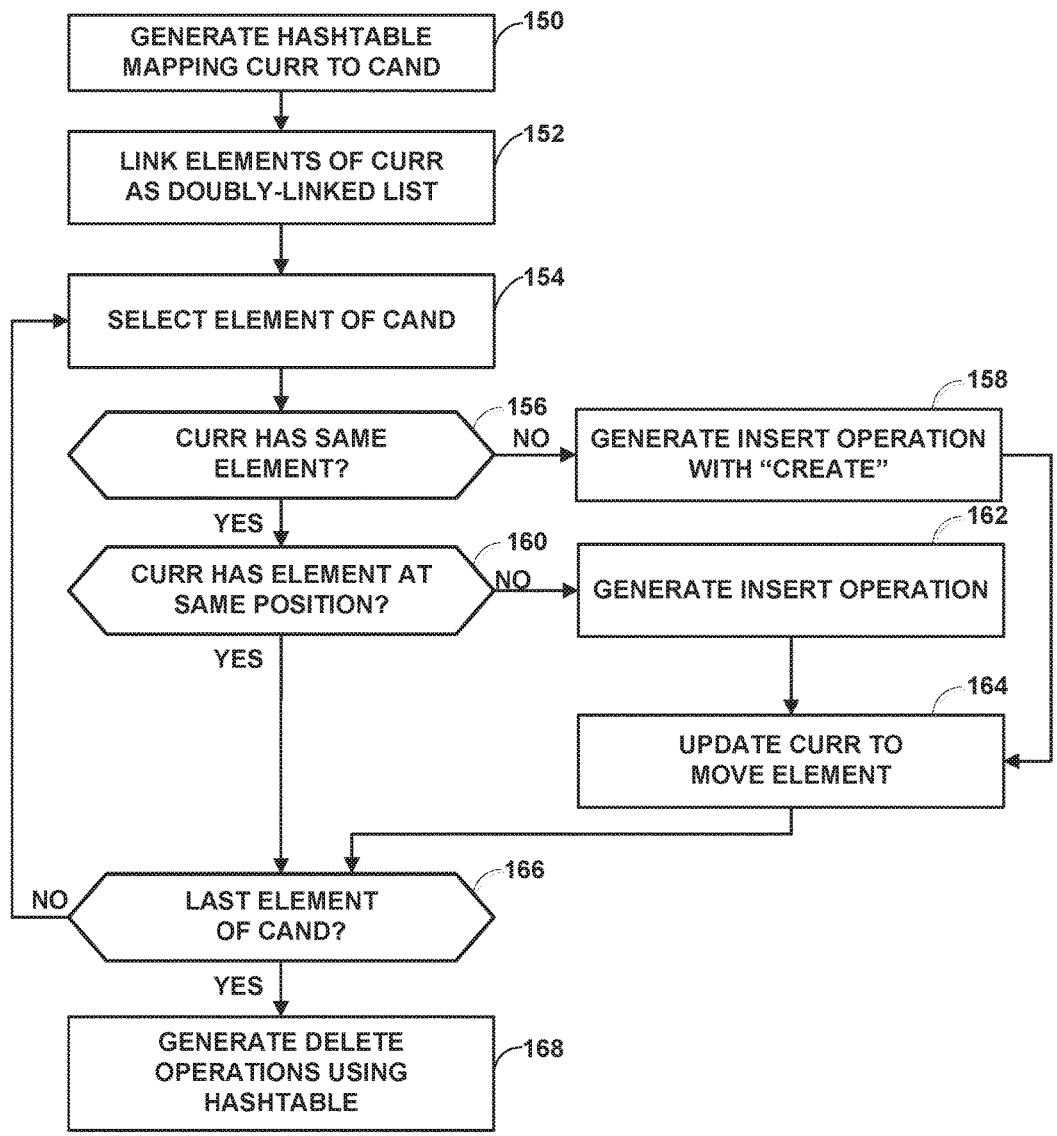
FIG. 5 is a flowchart illustrating an example method for generating operations to transform a current set of values into a candidate set of values according to the techniques of this disclosure.

FIG. 5 is a flowchart illustrating an example method for generating operations to transform a current set of values into a candidate set of values according to the techniques of this disclosure. For purposes of explanation, the method of FIG. 5 is explained as being performed by management device 10, although it should be understood that other devices may be configured to perform the techniques of FIG. 5 as well. Management device 10 may perform the method of FIG. 5 as part of, e.g., steps 108 and 110 of the method of FIG. 3. The method of FIG. 5 generally corresponds to Algorithm A as discussed above. It is assumed, as discussed above with respect to FIG. 3, that management device 10 includes a current set of configuration data that was previously sent to one or more of elements 14 and includes a current set of values (CURR) for which ordering is important, and that management device 10 has received a candidate set of configuration data that is to be applied to one or more of elements 14 and that includes a candidate set of values (CAND) for which ordering is important and corresponding to CURR.

After management device 10 has received CURR and CAND, in this example, management device 10 generates a hashtable including key values that map indexes of elements in CURR to index values of matching elements in CAND (150). In particular, management device 10 may iterate over the elements of CURR and populate the hashtable with index values for elements of CURR. Management device 10 may then iterate over elements in CAND, create a map (e.g., candidate_to_current_index_map[ ]), populate the hashtable with index values for elements in CAND. For a current index value of a current element of CAND, management device 10 may determine whether CURR includes the element, and if so, set the value of candidate_to_current_index_map[candidate_index](where candidate_index represents the index value of the current element in CAND) equal to the index value of the element in CURR (i.e., current_index).

Management device 10 may then link the elements of CURR as a doubly-linked list (152). That is, each element of CURR may have a forward reference to a next element of CURR and a backward reference to a previous element of CURR.

Management device 10 then selects an element of CAND (154) (e.g., an ordinal first element of CAND). Management device 10 uses the hashtable to determine whether CURR has the same element (156), and if so ("YES" branch of 156), whether the element is at the same position in CURR as in CAND (160). If CURR does not include the element ("NO" branch of 156), management device 10 generates an "insert" operation, e.g., in NetConf, along with an "operation=create" tag (158). Management device 10 generates the insert and create tags to cause one of elements 14 to create the element and to insert the newly created element at the corresponding position. If CURR does include the element, but at a different position than in CAND ("NO" branch of 160), management device 10 generates an "insert" operation, without the "create" tag (162). The "insert" operation is constructed to cause the one of elements 14 to insert the element at the appropriate position, thereby moving the element from its current position to the new position, i.e., the position within CAND. In either case, management device 10 updates CURR to move the element to this location (164), which includes updating forward and backward references of elements in CURR to preserve the doubly linked list structure of CURR.

After updating CURR or after determining that CURR includes the element at the same position as in CAND ("YES" branch of 160), management device 10 determines whether the last element of CAND has been analyzed (166). If not ("NO" branch of 166), management device 10 selects a subsequent element of CAND (154) and determines whether to generate an insert operation, e.g., in NetConf, per steps 156-164 as discussed above. Otherwise, if the last element of CAND has been analyzed ("YES" branch of 166), management device 10 generates delete operations using the hashtable to delete any of the elements in CURR that are not included in CAND (168).

The process described with respect to FIG. 5 has a complexity of $O(n)$, where n represents the number of elements included in CAND and CURR. Thus, this method is much more efficient than conventional $O(n^2)$ re-ordering algorithms. That is, the run-time of the process described with respect to FIG. 5 is linear, instead of quadratic, and therefore may considerably improve the performance of processors performing this process, in terms of number of operations performed by the processors.

Figure 6:
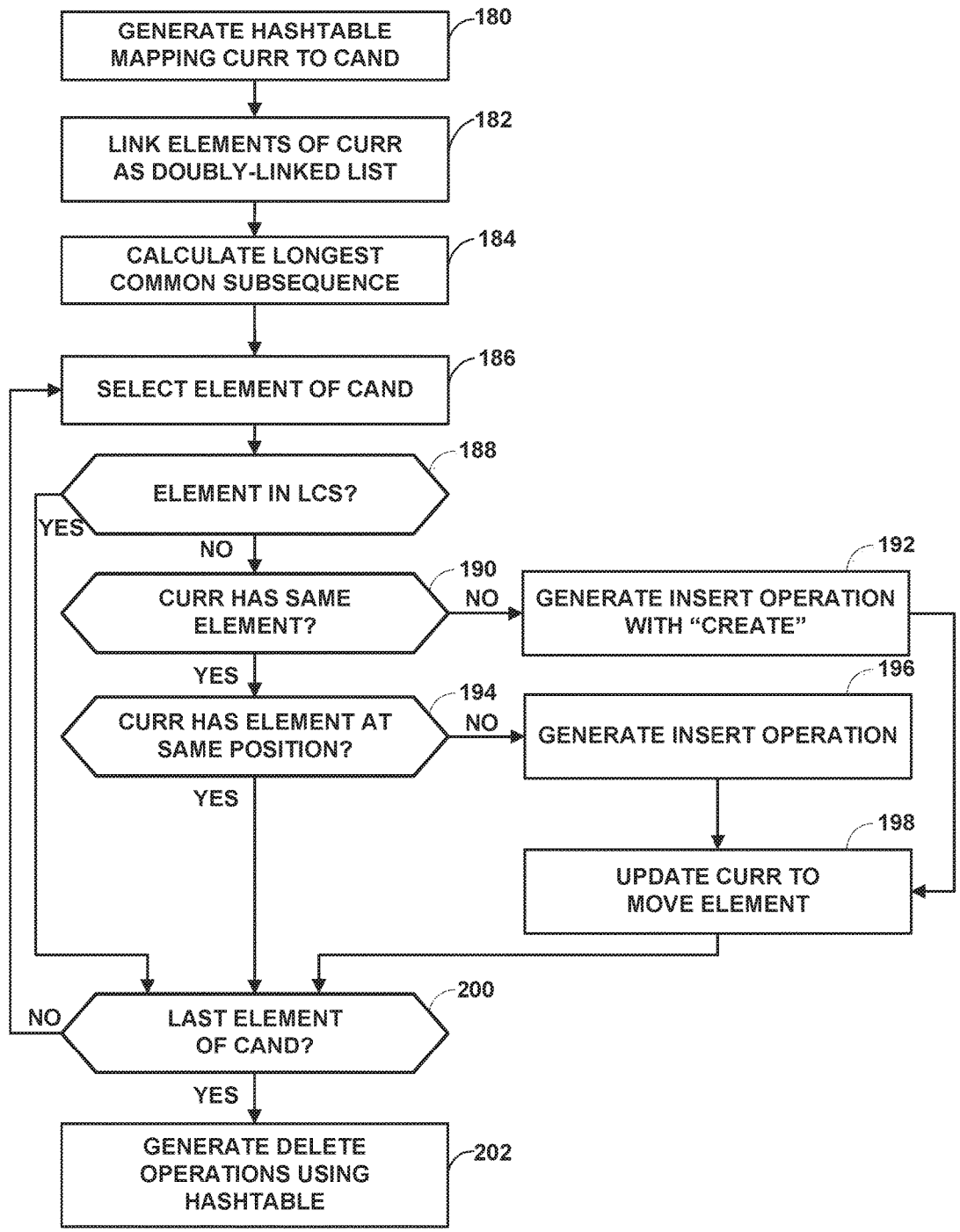
FIG. 6 is a flowchart illustrating another example method for generating operations to transform a current set of values into a candidate set of values according to the techniques of this disclosure.

FIG. 6 is a flowchart illustrating another example method for generating operations to transform a current set of values into a candidate set of values according to the techniques of this disclosure. For purposes of explanation, the method of FIG. 6 is explained as being performed by management device 10, although it should be understood that other devices may be configured to perform the techniques of FIG. 6 as well. Management device 10 may perform the method of FIG. 6 as part of, e.g., steps 108 and 110 of the method of FIG. 3. The method of FIG. 6 generally corresponds to Algorithm B as discussed above. It is assumed, as discussed above with respect to FIG. 3, that management device 10 includes a current set of configuration data that was previously sent to one or more of elements 14 and includes a current set of values (CURR) for which ordering is important, and that management device 10 has received a candidate set of configuration data that is to be applied to one or more of elements 14 and that includes a candidate set of values (CAND) for which ordering is important and corresponding to CURR.

After management device 10 has received CURR and CAND, in this example, management device 10 generates a hashtable including key values that map indexes of elements in CURR to index values of matching elements in CAND (180). In particular, management device 10 may iterate over the elements of CURR and populate the hashtable with index values for elements of CURR. Management device 10 may then iterate over elements in CAND, create a map (e.g., candidate_to_current_index_map[ ]), populate the hashtable with index values for elements in CAND. For a current index value of a current element of CAND, management device 10 may determine whether CURR includes the element, and if so, set the value of candidate_to_current_index_map[candidate_index](where candidate_index represents the index value of the current element in CAND) equal to the index value of the element in CURR (i.e., current_index).

Management device 10 may then link the elements of CURR as a doubly-linked list (182). That is, each element of CURR may have a forward reference to a next element of CURR and a backward reference to a previous element of CURR. In this example, management device 10 further calculates a longest common subsequence (LCS) between elements of CURR and elements of CAND (184), and marks the elements in the LCS of CAND as such.

Management device 10 then selects an element of CAND (186) (e.g., an ordinal first element of CAND). In this example, management device 10 determines whether the element is included in the LCS (188). If the element is in the LCS ("YES" branch of 188), management device 10 skips the element.

If the element is not in the LCS ("NO" branch of 188), management device 10 uses the hashtable to determine whether CURR has the same element (190), and if so ("YES" branch of 190), whether the element is at the same position in CURR as in CAND (194). If CURR does not include the element ("NO" branch of 190), management device 10 generates an "insert" operation along with an "operation=create" tag (192). Management device 10 generates the insert and create tags to cause one of elements 14 to create the element and to insert the newly created element at the corresponding position. If CURR does include the element, but at a different position than in CAND ("NO" branch of 194), management device 10 generates an "insert" operation, e.g., in NetConf, without the "create" tag (196). The "insert" operation is constructed to cause the one of elements 14 to insert the element at the appropriate position, thereby moving the element from its current position to the new position, i.e., the position within CAND. In either case, management device 10 updates CURR to move the element to this location (198), which includes updating forward and backward references of elements in CURR to preserve the doubly linked list structure of CURR.

After updating CURR, determining that CURR includes the element at the same position as in CAND ("YES" branch of 194), or determining that the element is in the LCS ("YES" branch of 188), management device 10 determines whether the last element of CAND has been analyzed (200). If not ("NO" branch of 200), management device 10 selects a subsequent element of CAND (186) and determines whether to generate an insert operation, e.g., in NetConf, per steps 188-198 as discussed above. Otherwise, if the last element of CAND has been analyzed ("YES" branch of 200), management device 10 generates delete operations using the hashtable to delete any of the elements in CURR that are not included in CAND (202). Again, such delete operations may be defined according to NetConf.

The process described with respect to FIG. 6 generally has a complexity of $O(n)$, where n represents the number of elements included in CAND and CURR, although the process of calculating the LCS is $O(n^2)$. However, performance of the process of FIG. 6 generates an optimal number of insert operations, which may ultimately be more efficient than Algorithm A discussed above, if for example only a small number of elements in CAND are moved with respect to CURR. Thus, the resulting operations (e.g., NetConf operations) generated by this method may be more efficient than those generated by Algorithm A as discussed above. That is, the number of operations to be executed by elements 14 resulting from the process of FIG. 6 may be smaller than the number of operations to be executed by elements 14 resulting from the process of FIG. 5, which may improve the performance of processors of elements 14, in terms of number of operations performed by these processors.

Figure 7:
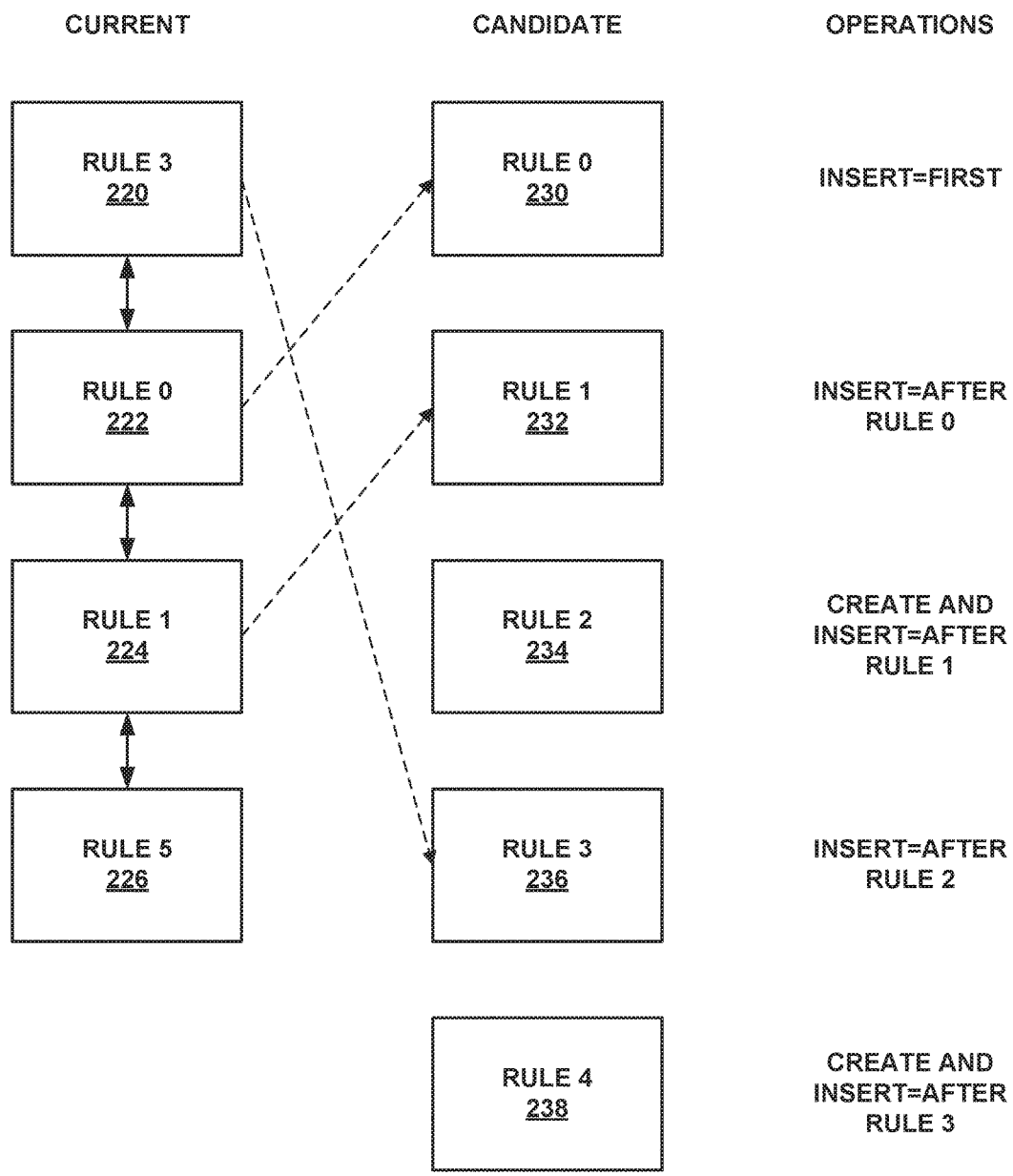
FIG. 7 is a conceptual diagram illustrating an example current set of values and an example candidate set of values.

FIG. 7 is a conceptual diagram illustrating an example current set of values and an example candidate set of values. The current set of values is labeled "current" and the candidate set of values is labeled "candidate" in FIG. 7. FIG. 7 also illustrates a set of operations (e.g., NETCONF commands) that may be generated according to the example of Algorithm A to transform the current set of values into the candidate set of values.

In this example, the current set of values includes Rule 3 220, Rule 0 222, Rule 1 224, and Rule 5 226. Furthermore, the current set of values are linked as a doubly-linked list. That is, Rule 3 220 is linked to Rule 0 222 as a next element, Rule 0 222 is linked to Rule 3 220 as a previous element and to Rule 1 224 as a next element, Rule 1 224 is linked to Rule 0 222 as a previous element and to Rule 5 226 as a next element, and Rule 5 226 is linked to Rule 1 224 as a previous element.

In this example, the candidate set of values includes Rule 0 230, Rule 1 232, Rule 2 234, Rule 3 236, and Rule 4 238. As can be seen, relative to the current set of values, the candidate set of values includes Rule 0 230 and Rule 1 232 in a different position than the positions of corresponding Rule 0 222 and Rule 1 224 of the current set of values. Thus, according to Algorithm A, management device 10 may generate an "insert=first" operation for Rule 0 222 and an "insert=after rule 0" operation for Rule 1 224, to move Rule 0 222 to Rule 0 230 and to move Rule 1 224 to Rule 1 232. Management device 10 may also determine that the current set of values does not include a rule labeled "Rule 2," and thus, management device 10 generates a "create and insert=after rule 1" operation to generate Rule 2 234. Management device 10 may further generate an "insert=after rule 2" operation to move Rule 3 220 to Rule 3 236. Management device 10 may also determine that the current set of values does not include a rule labeled "Rule 4," and thus, management device 10 generates a "create and insert=after rule 3" operation to generate Rule 4 23. In addition, management device 10 may generate a rule to delete Rule 5 226, although this operation is not shown in the example of FIG. 7.

As part of this procedure, management device 10 may generate a hashtable, as discussed above. The table below represents an example of such a hashtable:

| key | current_index | candidate_index | offset |
| --- | --- | --- | --- |
| Rule0 | 1 | 0 | |
| Rule1 | 2 | 1 | |
| Rule2 | | 2 | |
| Rule3 | 0 | 3 | 3 |
| Rule4 | | 4 | |
| Rule5 | 3 | | |

Figure 8:
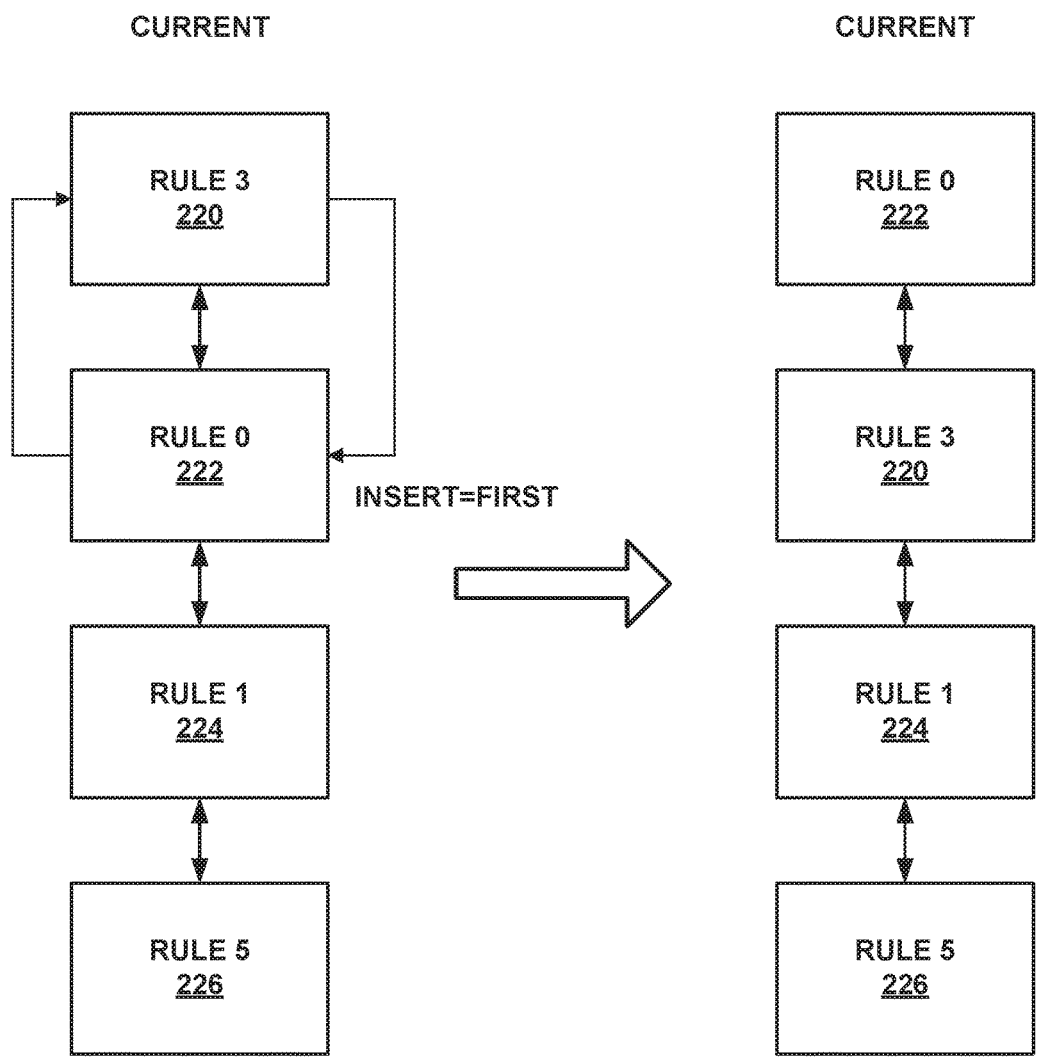
FIG. 8 is a conceptual diagram illustrating modification to a doubly linked list as part of the techniques of this disclosure.

FIG. 8 is a conceptual diagram illustrating modification to a doubly linked list as part of the techniques of this disclosure. In particular, FIG. 8 illustrates how the doubly linked list representing the current set of values of FIG. 7 is updated following generation of the "insert=first" operation, as part of performance of Algorithm A. As shown in FIG. 8, after generation of the "insert-first" operation for Rule 0 222, the positions of Rule 0 222 and Rule 3 220 are swapped. Therefore, management device 10 updates the doubly linked list such that Rule 0 222 is linked to Rule 3 220 as a next element, and such that Rule 3 220 is linked to Rule 0 222 as a previous element and to Rule 1 224 as a next element.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving a candidate set of values representing a final state of a current set of values after one or more operations on the current set of values have been performed on the current set of values;
generating a hashtable having key values that map index values of elements in the current set of values to index values of matching elements in the candidate set of values, comprising:
adding the index values of the elements in the current set of values to the hashtable; and
for each element in the candidate set of values, adding the element in the candidate set of values to a key value of the hashtable when the hashtable includes the element in the current set of values that matches the element in the candidate set of values;
generating, using the hashtable, a first set of operations of the one or more operations, the first set of operations comprising add or move operations to add or move elements to the current set of values that are present in an order in the candidate set of values but are not present in the order in the current set of values; and
generating, using the hashtable, a second set of operations of the one or more operations, the second set of operations comprising delete operations to delete elements in the current set of values that are not present in the candidate set of values.

2. The method of claim 1, wherein generating the hashtable comprises generating a map of the index values for the elements in the candidate set of values to the index values for corresponding elements in the current set of values.

3. The method of claim 2, further comprising constructing a doubly-linked list representing the current state of elements, wherein generating the first set of operations comprises, for at least one element in the candidate set of values:
determining that the current set of values does not include a corresponding element to the at least one element using the map;
in response to determining that the current set of values does not include the corresponding element, generating an insert tag operation with "operation=create" to insert an element corresponding to the at least one element in the candidate set of values, and updating the doubly-linked list to include the element corresponding to the at least one element.

4. The method of claim 2, further comprising constructing a doubly-linked list representing the current state of elements, wherein generating the first set of operations comprises, for at least one element in the candidate set of values:
determining that the current set of values does not include a corresponding element to the at least one element using the map at a position of the at least one element;
in response to determining that the current set of values does not include the corresponding element of the at least one element, generating an insert tag to insert an element of the current set of values corresponding to the at least one element at the position in the current set of values, and updating the doubly-linked list to include the element corresponding to the at least one element at the position.

5. The method of claim 1, further comprising calculating a longest common subsequence between the elements of the current set of values and the elements of the candidate set of values, wherein generating the first set of operations comprises skipping elements in the longest common subsequence.

6. The method of claim 5,
wherein generating the hashtable comprises determining a maximum offset value representing a maximum distance between positions of corresponding elements in the current set of values and the candidate set of values;
the method further comprising:
determining an acceptable number of sub-optimal moves value; and
determining that the maximum offset is greater than the acceptable number of sub-optimal moves value,
wherein calculating the longest common subsequence comprises calculating the longest common subsequence in response to determining that the maximum offset is greater than the acceptable number of sub-optimal moves value.

7. The method of claim 6, wherein determining the acceptable number of sub-optimal moves value comprises:
determining a skew value between 0 and 1; and
calculating the acceptable number of sub-optimal moves value as being equal to the skew value multiplied by a size of the current set of values.

8. The method of claim 1, wherein the current set of values represents a current collection of objects for which order matters, and wherein the candidate set of values represents a candidate collection of objects for which order matters.

9. The method of claim 1, wherein the current set of values represents a current set of policies to be administered by a firewall device, and wherein the candidate set of values represents a candidate set of policies to be administered by the firewall device.

10. The method of claim 1, further comprising sending the first set of operations and the second set of operations to a network device to cause the network device to perform the first set of operations and the second set of operations on a current set of values stored as configuration data of the network device.

11. A device comprising:
one or more memories configured to store a current set of values and a candidate set of values representing a final state of the current set of values after one or more operations on the current set of values have been performed on the current set of values; and
one or more processors implemented in circuitry and configured to:
generate a hashtable having key values that map index values of elements in the current set of values to index values of matching elements in the candidate set of values, wherein to generate the hashtable, the one or more processors are configured to:
add the index values of the elements in the current set of values to the hashtable; and
for each element in the candidate set of values, add the element in the candidate set of values to a key value of the hashtable when the hashtable includes the element in the current set of values that matches the element in the candidate set of values;

generate, using the hashtable, a first set of operations of the one or more operations, the first set of operations comprising add or move operations to add or move elements to the current set of values that are present in an order in the candidate set of values but are not present in the order in the current set of values; and generate, using the hashtable, a second set of operations of the one or more operations, the second set of operations comprising delete operations to delete elements in the current set of values that are not present in the candidate set of values.

12. The device of claim 11, wherein to generate the hashtable, the one or more processors are configured to generate a map of the index values for the elements in the candidate set of values to the index values for corresponding elements in the current set of values.

13. The device of claim 12, wherein the one or more processors are further configured to construct a doubly-linked list representing the current state of elements, wherein to generate the first set of operations for at least one element in the candidate set of values, the one or more processors are configured to:

determine that the current set of values does not include a corresponding element to the at least one element using the map;

in response to determining that the current set of values does not include the corresponding element, generate an insert tag operation with "operation=create" to insert an element corresponding to the at least one element in the candidate set of values, and update the doubly-linked list to include the element corresponding to the at least one element.

14. The device of claim 12, wherein the one or more processors are further configured to construct a doubly-linked list representing the current state of elements, wherein to generate the first set of operations for at least one element in the candidate set of values, the one or more processors are configured to:

determine that the current set of values does not include a corresponding element to the at least one element using the map at a position of the at least one element;

in response to determining that the current set of values does not include the corresponding element of the at least one element, generate an insert tag to insert an element of the current set of values corresponding to the at least one element at the position in the current set of values, and update the doubly-linked list to include the element corresponding to the at least one element at the position.

15. The device of claim 11, wherein the one or more processors are further configured to calculate a longest common subsequence between the elements of the current set of values and the elements of the candidate set of values, wherein to generate the first set of operations, the one or more processors are configured to skip elements in the longest common subsequence.

16. The device of claim 15,
wherein to generate the hashtable, the one or more processors are configured to determine a maximum offset value representing a maximum distance between positions of corresponding elements in the current set of values and the candidate set of values;
wherein the one or more processors are further configured to:
determine an acceptable number of sub-optimal moves value; and
determine that the maximum offset is greater than the acceptable number of sub-optimal moves value, and wherein the one or more processors are configured to calculate the longest common subsequence in response to determining that the maximum offset is greater than the acceptable number of sub-optimal moves value.

17. The device of claim 16, wherein to determine the acceptable number of sub-optimal moves value, the one or more processors are configured to:
determine a skew value between 0 and 1; and
calculate the acceptable number of sub-optimal moves value as being equal to the skew value multiplied by a size of the current set of values.

18. The device of claim 11, wherein the current set of values represents a current collection of objects for which order matters, and wherein the candidate set of values represents a candidate collection of objects for which order matters.

19. The device of claim 11, wherein the current set of values represents a current set of policies to be administered by a firewall device, and wherein the candidate set of values represents a candidate set of policies to be administered by the firewall device.

20. The device of claim 11, further comprising a network interface communicatively coupled to a network device, wherein the one or more processors are configured to send the first set of operations and the second set of operations to the network device via the network interface to cause the network device to perform the first set of operations and the second set of operations on a current set of values stored as configuration data of the network device.

21. A system comprising:
a network device; and
a management device comprising:
one or more memories configured to store a current set of values and a candidate set of values representing a final state of the current set of values after one or more operations on the current set of values have been performed on the current set of values;
a network interface that communicatively couples the management device to the network device; and
one or more processors implemented in circuitry and configured to:
generate a hashtable having key values that map index values of elements in the current set of values to index values of matching elements in the candidate set of values, wherein to generate the hashtable, the one or more processors are configured to:
add the index values of the elements in the current set of values to the hashtable; and
for each element in the candidate set of values, add the element in the candidate set of values to a key value of the hashtable when the hashtable includes the element in the current set of values that matches the element in the candidate set of values;
generate, using the hashtable, a first set of operations of the one or more operations, the first set of operations comprising add or move operations to add or move elements to the current set of values that are present in an order in the candidate set of values but are not present in the order in the current set of values;
generate, using the hashtable, a second set of operations of the one or more operations, the second set of operations comprising delete operations to delete elements in the current set of values that are not present in the candidate set of values; and send the first set of operations and the second set of operations to the network device via the network interface to cause the network device to perform the first set of operations and the second set of operations on a current set of values stored as configuration data of the network device.

22. A computer-readable storage medium having stored thereon instructions that, when executed, cause a processor to:

receive a candidate set of values representing a final state of a current set of values after one or more operations on the current set of values have been performed on the current set of values;

generate a hashtable having key values that map index values of elements in the current set of values to index values of matching elements in the candidate set of values, wherein the instructions that cause the processor to generate the hashtable comprise instructions that cause the processor to:

add the index values of the elements in the current set of values to the hashtable; and for each element in the candidate set of values, add the element in the candidate set of values to a key value of the hashtable when the hashtable includes the element in the current set of values that matches the element in the candidate set of values;

generate, using the hashtable, a first set of operations of the one or more operations, the first set of operations comprising add or move operations to add or move elements to the current set of values that are present in an order in the candidate set of values but are not present in the order in the current set of values; and generate, using the hashtable, a second set of operations of the one or more operations, the second set of operations comprising delete operations to delete elements in the current set of values that are not present in the candidate set of values.

* * * * *